(12) United States Patent
Waldner et al.

(10) Patent No.: US 7,556,303 B2
(45) Date of Patent: Jul. 7, 2009

(54) LIFT GATE LATCH TRANSFER MECHANISM

(75) Inventors: Miguel Waldner, Troy, MI (US); Christopher T. Archutowski, Washington, MI (US); Brad Stewart, Shelby Township, MI (US); Herbert Gruber, Rochester Hills, MI (US)

(73) Assignee: Magna International Inc., Aurora, Ontario (CA)

( * ) Notice: Subject to any disclaimer, the term of this patent is extended or adjusted under 35 U.S.C. 154(b) by 181 days.

(21) Appl. No.: 11/696,903

(22) Filed: Apr. 5, 2007

(65) Prior Publication Data

US 2007/0284903 A1 Dec. 13, 2007

Related U.S. Application Data

(60) Provisional application No. 60/790,521, filed on Apr. 7, 2006.

(51) Int. Cl.
*B62D 33/037* (2006.01)
(52) U.S. Cl. .................. 296/51; 292/194; 292/210; 292/DIG. 42; 49/192
(58) Field of Classification Search .................. 296/51, 296/57.1, 50, 106, 146.8; 292/216, 194, 292/195, 202, 210, DIG. 42, 340, 336; 49/192
See application file for complete search history.

(56) References Cited

U.S. PATENT DOCUMENTS 2,955,863 A * 10/1960 Olender ...................... 292/264
3,567,274 A * 3/1971 Kaptur, Jr. et al. ............ 296/50
3,592,504 A * 7/1971 Sandor ........................ 296/70
3,623,764 A * 11/1971 Jacobus ....................... 296/50
4,076,301 A * 2/1978 Gergoe ....................... 296/50
5,707,095 A * 1/1998 Pribak et al. ............... 296/57.1
7,093,876 B2 * 8/2006 Romig et al. ................. 296/50
7,243,973 B2 * 7/2007 Plett et al. .................. 296/57.1
7,481,479 B1 * 1/2009 Townson et al. .............. 296/51

* cited by examiner

*Primary Examiner*—H Gutman
*Assistant Examiner*—Melissa A Black
(74) *Attorney, Agent, or Firm*—Warn Hoffmann, Miller & Lalone P.C.

(57) ABSTRACT

A latch transfer mechanism is provided, including a tailgate having a first handle and a second handle, a lifter connected to a housing, a striker for selectively receiving a cable transfer pin, with the cable transfer pin operably associated with the lifter, and a connector connected to the cable transfer pin, which is also connected to the tailgate. The present invention also includes an actuating rod for actuating the lifter such that when the first handle is actuated, the housing, lifter, and actuating rod, will separate from the striker, and the cable transfer pin will remain received by the striker, allowing the connector to support the tailgate. When the second handle is actuated, the actuating rod will cause the lifter to pivot in relation to the housing, lifting the cable transfer pin out of the striker, allowing the lifter, actuating rod, and cable transfer pin to separate from the striker.

23 Claims, 5 Drawing Sheets

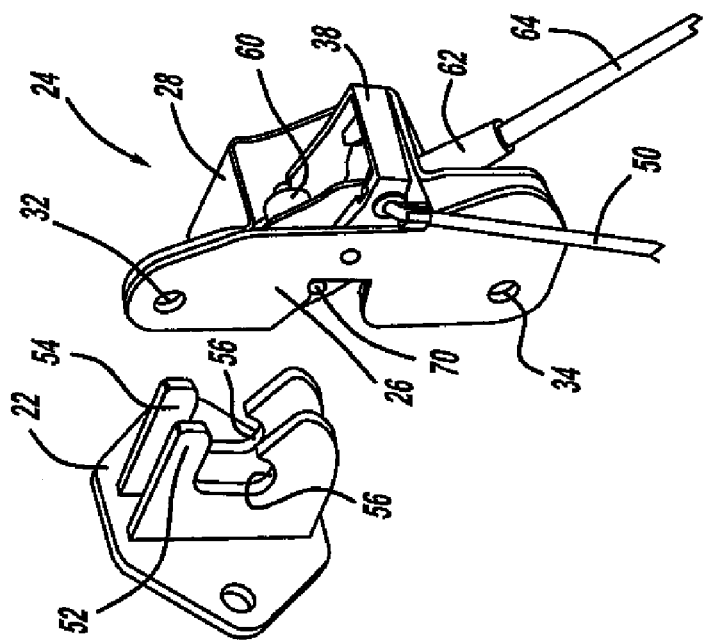
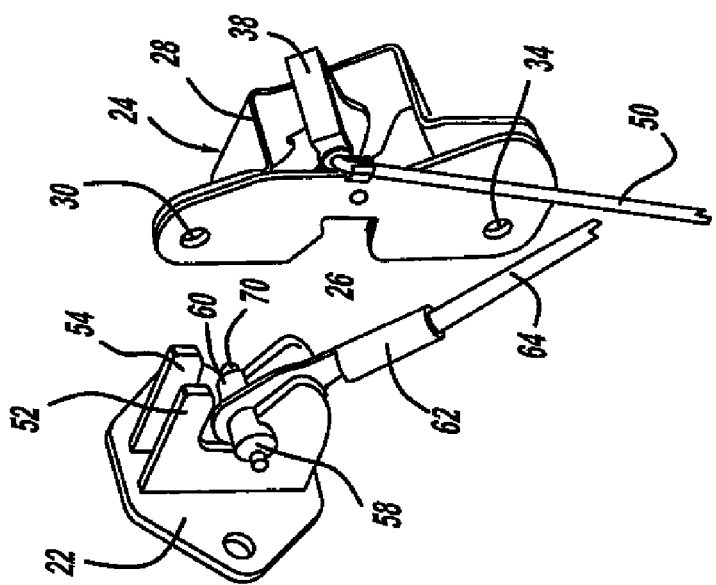
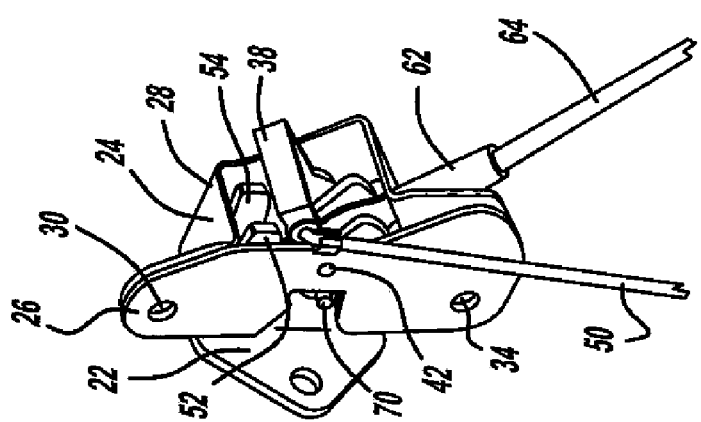

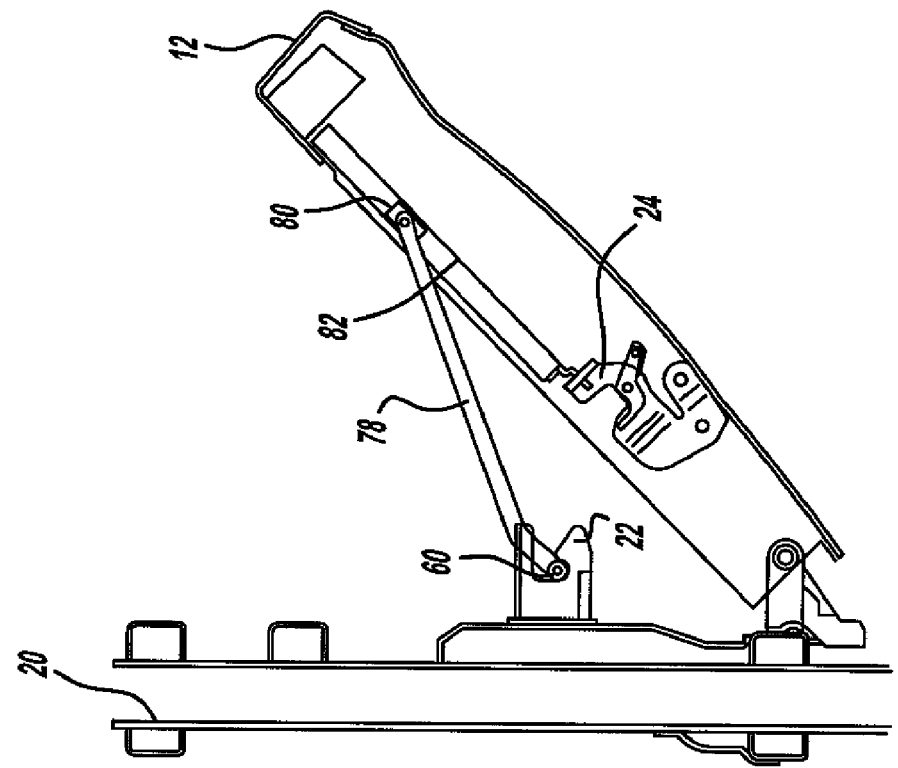
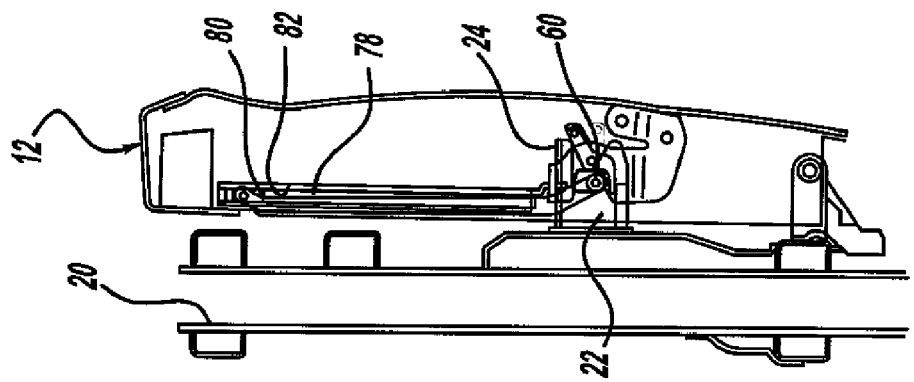
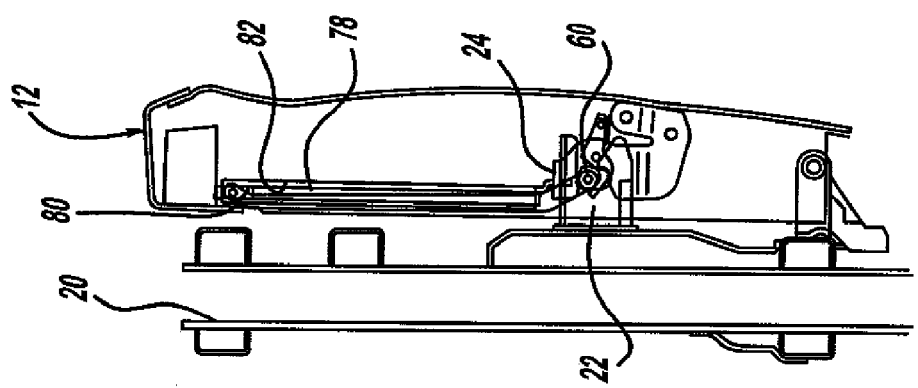

LIFT GATE LATCH TRANSFER MECHANISM

CROSS-REFERENCE TO RELATED APPLICATIONS

This application claims the benefit of U.S. Provisional Application No. 60/790,521, filed Apr. 7, 2006, and U.S. Provisional Application No. 60/811,953, filed Jun. 8, 2006.

FIELD OF THE INVENTION

The present invention relates to a latch transfer mechanism which is used for a tailgate. More particularly, the present invention is a latch transfer mechanism which allows for a tailgate to open in a drop down mode, as well as a swing mode.

BACKGROUND OF THE INVENTION

Tailgates on motorized vehicles are known, whether for example on a pick-up truck or an SUV. However, depending on the model of the motorized vehicle, the tailgate opens and closes in a certain direction. The tailgate can have a folding motion, as known with truck tailgates, or a swinging motion similar to that of a car door. Both opening motions have their benefits and drawbacks. For example, a folding tailgate is beneficial because it creates an extra surface or extension of the truck bed and allows an overhang beyond the frame of the vehicle which is useful during loading and unloading. However, the fold down tailgate is troublesome when objects are stored on the far side of the truck bed and one must stretch across the additional surface of the tailgate to reach the object. Likewise, the tailgate that has a swinging motion is beneficial because it swings to the side of the vehicle which allows one to reach across the truck bed to reach an object without stretching across the tailgate. However, the swinging tailgate does not have the benefits of an overhang beyond the vehicle frame for loading and unloading.

Therefore, it is desirable to develop a system which would allow the tailgate to open and close in both a folding direction and a swinging direction. However, in order to develop such a system, difficulties with hinge systems, latches, and support mechanisms to allow movement in multiple directions must be overcome. First, the tailgate must be connected to the motorized vehicle in multiple positions at certain times in order for the weight of the tailgate to be adequately supported. However, the tailgate cannot be attached to multiple positions on the motorized vehicle at all times because the connection of the tailgate at multiple places on the motorized vehicle will prevent the movement of the tailgate. Thus, a dual action latch system must be developed in which the tailgate and the motorized vehicle are connected in different ways depending on the operation or movement of the tailgate.

SUMMARY OF THE INVENTION

The present invention is a latch transfer mechanism including a tailgate having a first handle and a second handle, a lifter pivotably connected to a housing, a striker for selectively receiving a cable transfer pin, with the cable transfer pin operably associated with the lifter, and a connector connected to the cable transfer pin, which is also connected to the tailgate. The present invention also includes an actuating rod for actuating the lifter such that when the first handle is actuated, the housing, lifter, and actuating rod, will separate from the striker, and the cable transfer pin will remain received by the striker, allowing the connector to support the tailgate. When the second handle is actuated, the actuating rod will cause the lifter to pivot in relation to the housing, lifting the cable transfer pin out of the striker, allowing the lifter, actuating rod, and cable transfer pin to separate from the striker.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2a is a perspective view of a latch transfer mechanism in a closed position, according to the present invention;

FIG. 2b is a latch transfer mechanism used in a drop down mode, according to the present invention;

FIG. 2c is a latch transfer mechanism in a swing-open mode, according to the present invention;

FIG. 5a is a sectional view of a tailgate with another alternate embodiment of a latch transfer mechanism, according to the present invention;

FIG. 5b is a second sectional side view of a tailgate with another alternate embodiment of a latch transfer mechanism, according to the present invention; and FIG. 5c is a third sectional side view of a tailgate with another alternate embodiment of a latch transfer mechanism, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
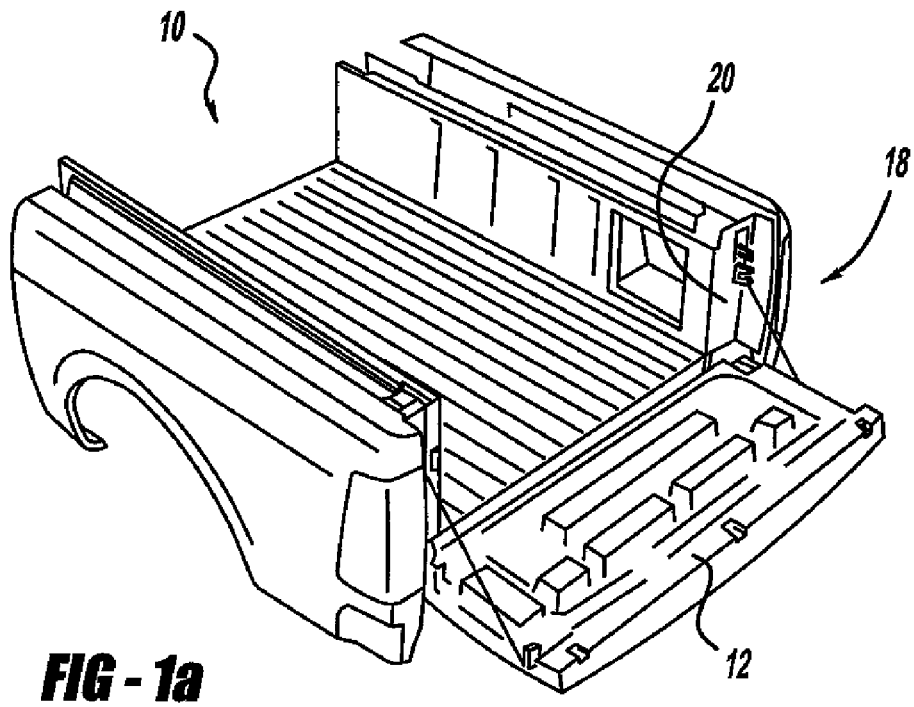
FIG. 1a is a perspective view of a pick up bed with a tailgate having a latch transfer mechanism in a drop-down mode, according to the present invention.
Figure 1B:
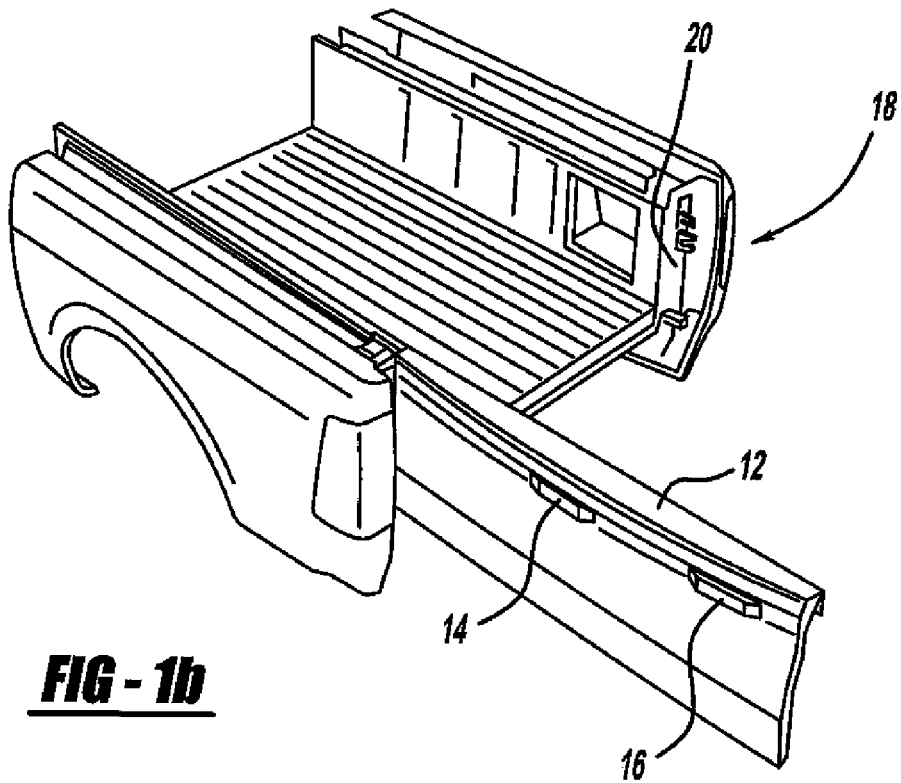
FIG. 1b is a pick-up bed with a tailgate having a latch transfer mechanism in a swing open mode, according to the present invention.
Figure 3:
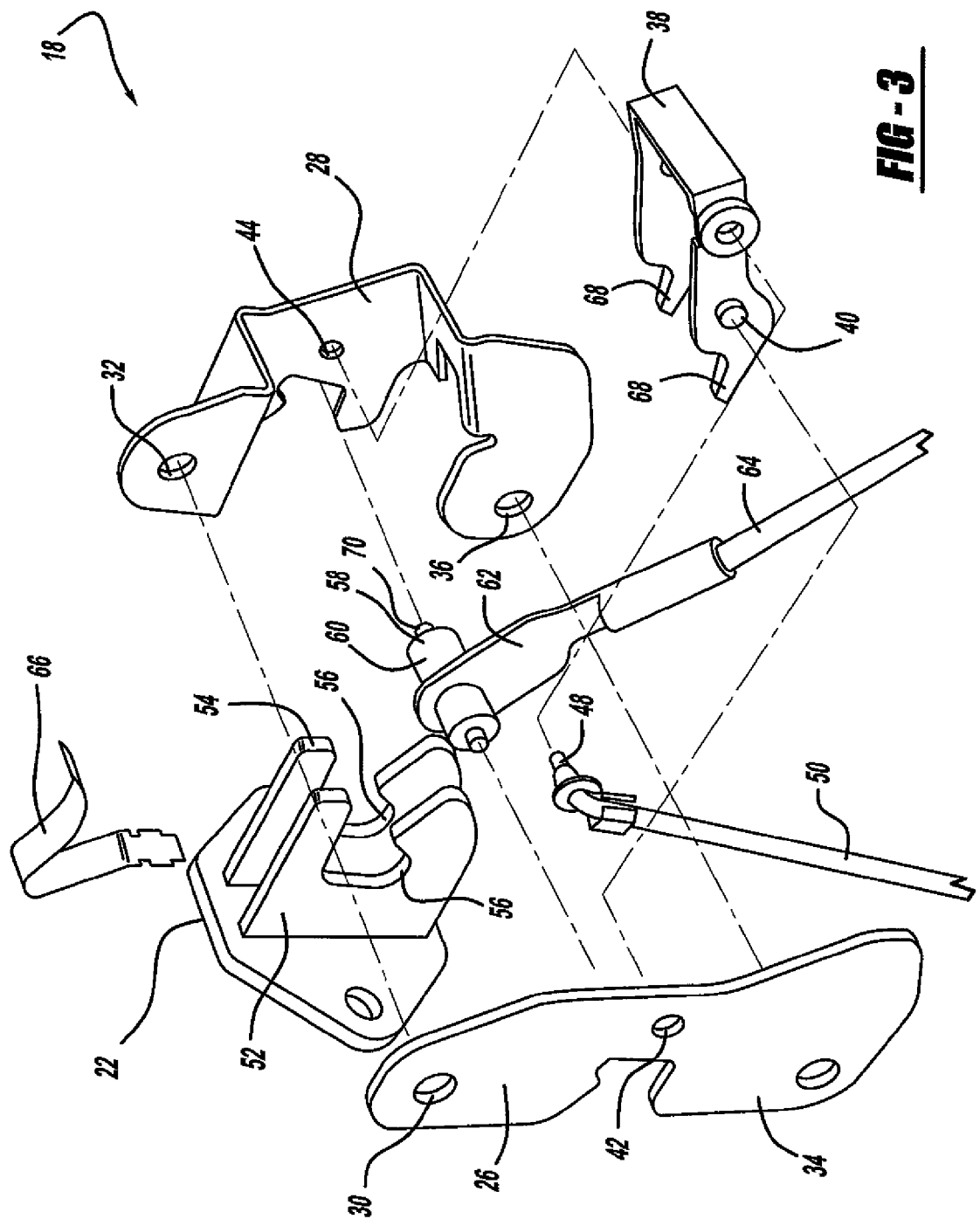
FIG. 3 is an exploded view of a latch transfer mechanism used in a tailgate, according to the present invention.

Referring to FIGS. 1a and 1b, a pickup bed having a tailgate with a dual action latch transfer mechanism according to the present invention, is generally shown at 10. The bed 10 has a tailgate 12 which has a first handle 14 and a second handle 16. The first handle 14 is used to open the tailgate 12 in a "drop-down mode," shown in FIG. 1a, and the second handle 16 is used to open the tailgate in a "swing mode," shown in FIG. 1b. In order for the bed 10 to be used in both drop-down mode and swing mode, a latch transfer mechanism, generally shown at 18, according to the present invention is connected to the D-pillar 20.

Referring to FIGS. 2a, 2b, 2c, and 3, the latch transfer mechanism 18 includes a striker 22 attached to the D-pillar 20. The latch transfer mechanism 18 also has a housing 24, the housing 24 having an inner plate 26 and an outer plate 28. The inner plate 26 has a first upper aperture 30 which aligns with a second upper aperture 32 of the outer plate 28. The inner plate 26 also has a first lower aperture 34 which aligns with a second lower aperture 36 on the outer plate 28. A suitable fastener is inserted through the upper apertures 30,32, and through the lower apertures 34,36 to connect the inner plate 26 and upper plate 26. The fastener could be a rivet, nut and bolt, screw, or the like.

Located in between the inner plate 26 and the outer plate 28 is a pivotable member, which in this embodiment is a lifter 38. The lifter 38 has a pair of protrusions or pins 40 which are received in a middle aperture 42 in the inner plate 26, and a middle aperture 44 in the outer plate 28. The lifter 38 is able to pivot about the pins 40. The lifter 38 also includes an aperture 46 for receiving a pin 48 on the end of an actuation member, which in this embodiment is an actuation rod 50. The actuation rod 50 is connected to the second handle 16, the function of which will be described later.

The striker 22 includes a first flange 52 and a second flange 54, the flanges 53,54 have hook portions 56 which are used for selectively receiving a large diameter portion 58 of a pin mechanism, which in this embodiment is a cable transfer pin 60. The cable transfer pin 60 is located on the end of a cable bracket 62, which is connected to a connector. The connector, which in this embodiment is a cable 64, is connected to the tailgate 12. Also attached to the striker 22 is a spring member, which in this embodiment is a wave spring 66. The wave spring 66 applies a force to the cable bracket 62. To lift the cable transfer pin 60 out of the hook portions 56, the lifter 38 has extensions 68 which a positioned next to the large diameter portion 58 of the cable transfer pin 60, and, when actuated, apply a force to a small diameter portion 70 of the cable transfer pin 60.

In operation, when the tailgate 12 is in the closed position, the latch transfer mechanism 18 will be in the position shown in FIG. 2a. When it is desired to open the tailgate 12 in drop-down mode, the first handle 14 is actuated, and the latch transfer mechanism 18 will be in the position shown in FIG. 2b. Since the actuating rod 50 is connected to the second handle 16, the lifter 38 will not pivot about the pins 40. The wave spring 64 applies a force to the cable bracket 62, which maintains the position of the cable transfer pin 60 in the hook portions 56, while allowing the housing 24, the lifter 38, and the actuation rod 50 to be separated from the striker 52, and the tailgate 12 to be placed in the position shown in FIG. 1a. The weight of the tailgate 12 is partially supported by the cable 64. The cable transfer pin 60 is supported by the hook portions 56 in the striker 22.

When it is desired for the tailgate 12 to be opened in swing mode, the second handle 16 is actuated, which causes the actuation rod 50 to rotate the lifter 38 about the pins 40. As this occurs, the extensions 68 will apply force to the small diameter portions 70, lifting the cable transfer pin 60 out of the hook portions 56, and the latch transfer mechanism 18 will be in the position shown in FIG. 2c. In this position, the housing 24, lifter 38, cable 64, and cable latch transfer pin 50 will all be separated from the striker 22, and the tailgate 12 can be placed in the position shown in FIG. 1b.

Figure 4C:
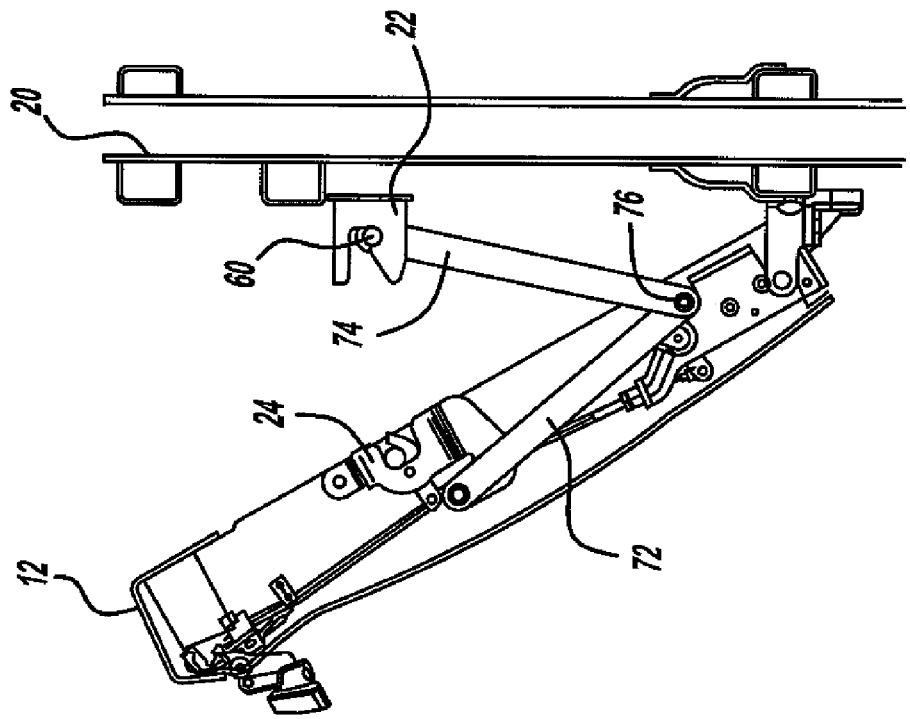
FIG. 4c is a third sectional side view of a tailgate with an alternate embodiment of a latch transfer mechanism, according to the present invention.
Figure 4B:
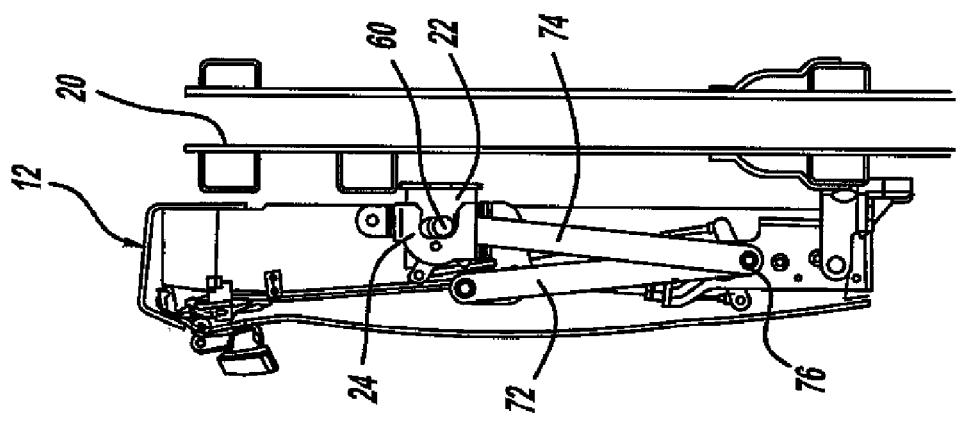
FIG. 4b is a second sectional side view of a tailgate with an alternate embodiment of a latch transfer mechanism, according to the present invention.
Figure 4A:
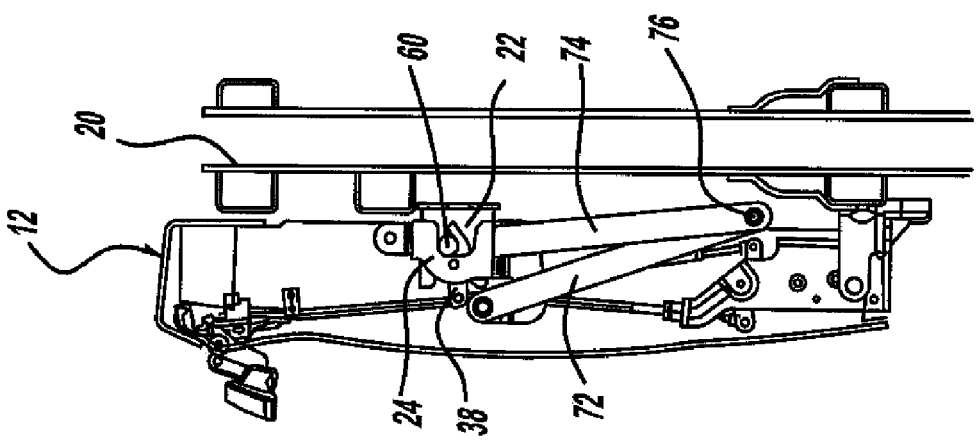
FIG. 4a is a sectional side view of a tailgate with an alternate embodiment of a latch transfer mechanism, according to the present invention.

Another embodiment of the present invention is shown in FIGS. 4a-4c, with like numbers referring to like elements. In this embodiment, the latch transfer mechanism 18 is similar to the first embodiment, with the difference being that the cable 64 has been replaced with a first link 72 connected to a second link 74 by a pivot point 76. The first link 72 is connected to the tailgate 12 in a similar manner as the cable 64, and the second link 74 also includes cable transfer pin 60, which attaches to the striker 22 in a similar manner in the first embodiment.

Another embodiment of the present invention is shown in FIGS. 5a-5c. In this embodiment, the cable 64 has been replaced with a sliding bar 78. The sliding bar 78 also has a cable transfer pin 60, similar to the first embodiment, but is also pivotally connected to a slider 80 which can slide in a slot 82. The slot 82 is formed into the tailgate 12. Once again, the cable transfer pin 60 can be selectively received by the striker 22 for allowing the tailgate 12 to operate in drop-down mode, or swing mode. When the tailgate 12 is moving in drop-down mode, the cable transfer pin 60 will pivot in the hook portions 56 of the striker 22, while the slider 80 slides in the slot 82. The cable transfer pin 60 can be detached from the striker 22 in a similar manner as the first embodiment. However, the length of the slot 82 is such that when the lifter 38 lifts the cable transfer pin 60 in an upward direction, the slider 80 will have the proper amount of space to also move in an upward direction when looking at FIG. 5a. The slider 80 moves upward in the slot 82 because the slider 80 is rigidly connected to the cable transfer pin 60 through the sliding bar 78. The slot 82 and the sliding bar 78 are also long enough such that the tailgate 10 will only be allowed to open to the position shown in FIG. 1a.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A latch transfer mechanism comprising:
   a tailgate having a first handle and a second handle;
   a lifter pivotally connected to a housing;
   a striker for selectively receiving a pin mechanism, said pin mechanism operably associated with said lifter;
   a connector connected to said pin mechanism, and connected to said tailgate;
   a spring member connected to said striker, operably associated with said pin mechanism;
   an actuation member for actuating said lifter;
   when said first handle is actuated, said housing, said lifter, and said actuation member will separate from said striker, and said pin mechanism will remain received by said striker from force applied by said spring member, allowing said connector to support said tailgate; and
   when said second handle is actuated, said actuating member will cause said lifter to pivot in relation to said housing, overcoming the force of said spring member, lifting said pin mechanism out of said striker, allowing said lifter, said actuating member, said housing, and said pin mechanism to separate from said striker.

2. The latch transfer mechanism of claim 1, wherein said actuation member is an actuating rod.

3. The latch transfer mechanism of claim 1, said pin mechanism further comprising of a cable transfer pin having a large diameter portion and a small diameter portion, said large diameter portion selectively received by said striker.

4. The latch transfer mechanism of claim 3, said lifter further comprising at least one extension, operably associated with said small diameter portion of said cable transfer pin such that when said actuation member causes said lifter to pivot in said housing, said at least one extension will apply a force to said small diameter portion of said cable transfer pin, separating said cable transfer pin from said striker.

5. The latch transfer mechanism of claim 3, said striker further comprising:
   a first flange having a hook portion;
   a second flange having a hook portion; and
   when said cable transfer pin is received in said striker, said large diameter portion is received in said hook portion of said first flange, and said hook portion of said second flange.

6. The latch transfer mechanism of claim 1, said connector further comprising:
   a first pivot member;
   a second pivot member pivotably connected to said first pivot member;
   said first pivot member pivotably connected to said tailgate;
   said second pivot member connected to said pin mechanism; and
   when said first handle is actuated, said housing, said lifter, and said actuation member will separate from said striker, said pin mechanism will remain received by said striker from force applied by said spring member, allowing said first pivot member to pivot in relation to said tailgate and said second pivot member, and said second pivot member to pivot in relation to said striker and said first pivot member.

7. The latch transfer mechanism of claim 1, said connector further comprising a cable connected to said pin mechanism and said tailgate.

8. The latch transfer mechanism of claim 1, said housing further comprising:
   an inner plate connected to an outer plate;
   a middle aperture formed in said inner plate;
   a middle aperture formed in said outer plate; and
   at least two pins formed on said lifter, one of said at least two pins received by said middle aperture of said inner plate, and another of said at least two pins received by said middle aperture of said outer plate, allowing said lifter to pivot relative to said inner plate and said outer plate.

9. The latch transfer mechanism of claim 1, said connector further comprising:
   a slot formed in said tailgate;
   a sliding bar connected to said pin mechanism;
   a slider pivotably connected to said sliding bar, said slider disposed within said slot; and
   when said first handle is actuated, said housing, said lifter, and said actuation member will separate from said striker, said pin mechanism will remain received by said striker because of force applied by said spring member, and said pin mechanism will pivot within said striker, allowing said sliding bar to pivot about said striker, said slider to slide in said slot.

10. A latch transfer mechanism for a tailgate, comprising:
    a pickup bed having a bed, at least one D-pillar, and said tailgate having a first handle and a second handle;
    a lifter disposed within a housing;
    a striker connected to said at least one D-pillar, said striker operably associated with said lifter;
    a wave spring connected to said striker;
    a cable transfer pin selectively received by said striker, said cable transfer pin connected to a connector and to said tailgate;
    an actuating member connected to said lifter and said second handle;
    when said first handle is actuated, said lifter will not apply force to said cable transfer pin, said wave spring will maintain the position of said cable transfer pin in said striker, and said housing, said lifter, and said actuating member will detach from said striker, allowing said cable transfer pin to be received by said striker, and said connector to support said tailgate; and
    when said second handle is actuated, said actuating member will pivot said lifter in said housing causing said lifter to apply force to said cable transfer pin, overcoming the force of said wave spring and lifting said cable transfer pin away from said striker, separating said cable transfer pin from said striker, allowing said lifter, said housing, said actuating member and said cable transfer pin to separate from said striker.

11. The latch transfer mechanism for a tailgate of claim 10, said actuation member further comprising an actuation rod.

12. The latch transfer mechanism for a tailgate of claim 10, further comprising:
    a small diameter portion formed on said cable transfer pin;
    a larger diameter portion formed on said cable transfer pin;
    said lifter having at least one extension; and
    when said lifter pivots in said housing, said at least one extension of said lifter will apply force to said small diameter portion of said cable transfer pin, and when said cable transfer pin is received by said striker, said striker will receive said larger diameter portion.

13. The latch transfer mechanism for a tailgate of claim 12, said striker further comprising a first flange having a hook portion, said first flange aligned with a second flange having a hook portion, and said hook portion of said first flange and said hook portion of said second flange selectively receive said large diameter portion of said cable transfer pin.

14. The latch transfer mechanism for a tailgate of claim 10, said connector further comprising a cable attached to said cable transfer pin and said tailgate.

15. The latch transfer mechanism for a tailgate of claim 10, said connector further comprising:
    a first pivot member pivotally connected to a second pivot member and said tailgate;
    said second pivot member connected to said cable transfer pin;
    when said first handle is actuated, said wave spring will maintain the position of said cable transfer pin in said striker, and said housing, said lifter, and actuation rod will separate from said striker, allowing said first pivot member to pivot in relation to said second pivot member and said tailgate, and said second pivot member to pivot in relation to said first pivot member and said striker, and said tailgate is placed in a position parallel to said bed; and
    when said second handle is actuated, said actuation rod will pivot said lifter in said housing, causing said lifter to apply force to said cable transfer pin, overcoming the force of said wave spring and lifting said cable transfer pin away from said striker such that said cable transfer pin, said lifter, said housing, and said actuation rod separate from said striker.

16. The latch transfer mechanism for a tailgate of claim 10, said connector further comprising:
    a slot formed in said tailgate;
    a sliding bar connected to said cable transfer pin, and pivotally connected to a slider, said slider slidably disposed within said slot;
    when said first handle is actuated, said wave spring will maintain the position of said cable transfer pin in said striker, said sliding bar will pivot in relation to said striker and said slider, said slider will slide in said slot; and when said second handle is actuated, said actuation rod will pivot said lifter in said housing, causing said lifter to apply force to said cable transfer pin, overcoming the force of said wave spring, and separating said cable transfer pin, said housing, said lifter, and said actuation rod from said striker.

17. A latch transfer mechanism for a tailgate, comprising:
a pickup bed having a bed, at least one D-pillar, and said tailgate having a first handle and a second handle;
a striker connected to said at least on D-Pillar;
a housing having an inner plate and an outer plate;
a lifter positioned in said housing between said inner plate and said outer plate;
an actuation rod connected to said lifter;
a cable transfer pin operably associated with said lifter and said striker, said cable transfer pin having a large diameter portion and a small diameter portion;
a connector connected to said cable transfer pin and said tailgate;
a spring member connected to said striker for selectively applying force to said cable transfer pin;
when said first handle is actuated, said lifter will remain in a stationary position relative to said housing, said spring member will maintain the position of said cable transfer pin in said striker, and said housing, said lifter, and said actuation rod will separate from said striker, allowing said cable transfer pin to be received in said striker, and said tailgate to be positioned parallel to said bed; and
when said second handle is actuated, said actuation rod will force said lifter to pivot in said housing, applying force to said cable transfer pin such that the force received from said spring member is overcome, causing said cable transfer pin, said housing, said lifter, and said actuation rod to separate from said striker.

18. The latch transfer mechanism for a tailgate of claim 17, said connector further comprising a cable connected to said cable transfer pin and said tailgate.

19. The latch transfer mechanism for a tailgate of claim 17, further comprising:
a middle aperture formed in said inner plate;
a middle aperture formed in said outer plate;
at least two pins connected to said lifter, one of said at least two pins received in said middle aperture of said inner plate, and another of said at least two pins received in said middle aperture of said outer plate; and
when said lifter pivots in said housing, said lifter will pivot out said at least two pins disposed within said middle aperture of inner plate, and said middle aperture of said outer plate.

20. The latch transfer mechanism for a tailgate of claim 17, said lifter further comprising at least one extension, such that when said lifter pivots in said housing, said at least one extension will apply force to said small diameter portion of said cable transfer pin.

21. The latch transfer mechanism of for a tailgate of claim 17, said striker further comprising:
a first flange having a hook portion;
a second flange having a hook portion; and
when said cable transfer pin is received by said striker, said larger diameter portion of said cable transfer pin will be received in said hook portion of said first flange and said hook portion of said second flange.

22. The latch transfer mechanism for a tailgate of claim 17, said connector further comprising:
a first pivot member pivotally connected to said tailgate;
a second pivot member pivotally connected to said first pivot member and said cable transfer pin; and
when said first handle is actuated, said lifter will not pivot in said housing, said cable transfer pin will receive apply force from said spring to maintain the position of said cable transfer pin in relation to said striker, and said housing, said lifter, and said actuation rod will separate from said striker, allowing said tailgate to be moved to a position such that said tailgate is parallel to said bed; and
when said second handle is actuated, actuation rod will cause said lifter to pivot relative to said housing, causing said lifter to apply force to said cable transfer pin such that said force from said spring member is overcome, and said cable transfer pin, said housing, said lifter, and said actuation rod are separated from said striker.

23. The latch transfer mechanism for a tailgate of claim 17, said connector further comprising:
a slot formed in said tailgate;
a sliding bar connected to said cable transfer pin;
a slider pivotally connected to said sliding bar, disposed within said slot;
when said first handle is actuated, said cable transfer pin will remain received in said striker from force applied by said spring member, said sliding bar will pivot about said cable transfer pin, and said housing, said lifter and said actuation rod will separate from said striker; and
when said second handle is actuated, said actuation rod will cause said lifter to pivot in said housing, applying force to said large diameter portion of said cable transfer pin, overcoming the force of said spring member, separating said cable transfer pin, said housing, said lifter, and said actuation rod from said striker.

* * * * *